US005374069A

United States Patent [19]

Pecina

[11] Patent Number: 5,374,069

[45] Date of Patent: Dec. 20, 1994

[54] ALUMINUM CORE CYLINDER HEAD GASKET FOR MARINE ENGINES

[75] Inventor: Joseph A. Pecina, Lindenhurst, Ill.

[73] Assignee: Outboard Marine Corporation, Waukegan, Ill.

[21] Appl. No.: 239,273

[22] Filed: May 6, 1994

Related U.S. Application Data

[63] Continuation of Ser. No. 570, Jan. 4, 1993, abandoned, which is a continuation of Ser. No. 791,417, Nov. 13, 1991, abandoned.

[51] Int. Cl.[5] .......... F16J 15/12

[52] U.S. Cl. .......... 277/235 B; 123/193.3

[58] Field of Search .......... 277/235 B, 235 R, 235 A, 277/233; 123/193.3

[56] References Cited

U.S. PATENT DOCUMENTS

| | | | |
|---|---|---|---|
| 1,587,626 | 6/1926 | Bailey . | |
| 1,863,521 | 6/1932 | Crane . | |
| 1,917,214 | 7/1933 | Bailey . | |
| 2,197,916 | 4/1940 | Balfe . | |
| 2,711,334 | 6/1955 | Balfe . | |
| 2,857,892 | 10/1958 | Hulsebus | 123/41.14 |
| 3,549,157 | 12/1970 | Bennigsen | 277/233 X |
| 3,740,062 | 6/1973 | Robins | 277/227 |
| 3,773,305 | 11/1973 | Fischer et al. | 261/72 R |
| 3,924,863 | 12/1975 | Nakano et al. | 277/235 B |
| 4,010,315 | 3/1977 | Mildner | 174/107 |
| 4,234,638 | 11/1980 | Yamazoe et al. | 428/133 |
| 4,272,085 | 6/1981 | Fujikawa et al. | 277/235 B |
| 4,330,585 | 5/1982 | Eyrard et al. | 277/235 B |
| 4,402,518 | 9/1983 | Locacius | 277/235 B X |
| 4,468,043 | 8/1984 | Brazel | 277/235 B |
| 4,468,044 | 8/1984 | Ulmer et al. | 277/235 B |
| 4,477,094 | 10/1984 | Yamamoto et al. | 277/235 B |
| 4,554,892 | 11/1985 | Amemori et al. | 123/193.3 X |
| 4,591,170 | 5/1986 | Nakamura et al. . | |
| 4,615,684 | 10/1986 | Kojima | 204/147 X |
| 4,705,278 | 10/1987 | Locacius et al. | 277/235 B |
| 4,723,783 | 2/1988 | Belter et al. . | |
| 4,728,110 | 3/1988 | Nakasone | 277/213 |
| 4,759,181 | 7/1988 | Biritz | 123/41.08 |
| 4,759,585 | 7/1988 | Udagawa | 277/235 B |
| 4,776,602 | 10/1988 | Gallo | 277/233 |
| 4,810,591 | 3/1989 | Sakai | 277/235 B |
| 4,834,279 | 5/1989 | McDowell | 277/235 B |
| 4,955,621 | 9/1990 | Skrycki | 277/235 B X |
| 4,956,226 | 9/1990 | Ashizawa et al. | 277/235 B |
| 5,004,650 | 4/1991 | Ashizawa et al. | 277/235 B X |
| 5,022,661 | 6/1991 | Nakasone | 277/213 |

FOREIGN PATENT DOCUMENTS

| | | | |
|---|---|---|---|
| 1961801 | 6/1970 | Germany | 277/235 B |
| 3714528.2 | 12/1987 | Germany . | |
| 955215 | 4/1964 | United Kingdom . | |
| 1116370 | 10/1969 | United Kingdom . | |

*Primary Examiner*—Scott W. Cummings

*Attorney, Agent, or Firm*—Greer, Burns & Crain, Ltd.

[57] ABSTRACT

A cylinder head gasket for use in a marine engine adapted to be cooled by the water in which the engine is running, the engine having a non-ferrous alloy cylinder head and a non-ferrous alloy engine block, both the block and cylinder head preferably being made of aluminum alloy. The gasket includes a metallic sheet forming a core, the core having upper and lower surfaces, layers of facing material securely disposed upon those upper and lower surfaces, and wherein the electrolytic solution potential of the metallic sheet is approximately equal to the respective electrolytic solution potentials of the engine block and the cylinder head.

19 Claims, 1 Drawing Sheet

ALUMINUM CORE CYLINDER HEAD GASKET FOR MARINE ENGINES

This is a continuation of copending application Ser. No. 08/000,570, filed Jan. 4, 1993, which is a continuation of application Ser. No. 07/791,417, filed Nov. 13, 1991, both now abandoned.

BACKGROUND OF THE INVENTION

The present invention relates to cylinder head gaskets for internal combustion engines adapted for marine use, and more specifically to a cylinder head gasket for a marine engine which is designed to minimize galvanic corrosion.

Conventional outboard-type marine engines employ ambient water as the coolant. When such engines are used in salt water, the circulation of salt water coolant through the engine has been found to cause accelerated galvanic corrosion of certain engine components. This galvanic corrosion has been particularly troublesome in engines made of non-ferrous metal alloys, such as aluminum alloys. For the sake of brevity, in this application, the term "aluminum" will be understood to refer to aluminum alloys of various compositions.

Salt water induced galvanic corrosion has been found to be especially severe in the cylinder head and engine block of aluminum engines. In these engines, an electrochemical reaction is created when aluminum cylinder heads and engine blocks are joined using a conventional automotive-type cylinder head gasket having a core made of cold rolled steel with a zinc coating, or a stainless steel core. These commonly-used cylinder head gaskets include a metallic core sandwiched between layers of facing material, the latter being used to distribute the clamping load of cylinder head bolts. The type of facing material normally employed has the ability to absorb moisture.

When the engine is operated in salt water, or in some cases polluted fresh water, the water acts as an electrolyte, and an electrochemical cell is induced between the cylinder head and the gasket core, and/or between the engine cylinder block and the gasket core. Even when the engine is not in use, and sea water is no longer circulating, but drains from the engine and motor housing, the still moist facing material prolongs the corrosive electrochemical reaction until the facing material dries out.

Theoretically, the greater the difference in solution potential between the dissimilar contacting metals, the larger the driving force of the electrochemical reaction which causes galvanic corrosion. Since zinc has a higher solution potential than aluminum or steel, the zinc coating of the cylinder head gasket acts as a sacrificial anode and usually dissolves first due to galvanic corrosion. Upon total or at least substantial dissolution of the zinc coating, the cylinder head or engine block then becomes the anode and also begins dissolving. In the case of stainless steel core gaskets not having a zinc coating, the aluminum cylinder head or engine block immediately acts as the anode and begins to dissolve as soon as the electrolyte is introduced.

This condition is a significant deterrent to marine engine longevity, and has been observed to be unusually severe in marine engines having an aluminum cylinder head and an aluminum engine block, when the engines are used in salt water in warm climates. Larger displacement aluminum engines which remain at least partially in the water, even when not in use, are particularly susceptible to galvanic corrosion. Galvanic corrosion has resulted in premature engine block failure, a problem which can only be corrected, short of replacing the engine, by dismantling the engine and replacing the block, an expensive and laborious task.

Despite the magnitude of the galvanic corrosion problem in aluminum marine engines, there has been little incentive for marine engine gasket suppliers to address the problem of galvanic corrosion in nonferrous alloy marine engines. This is due in part to the fewer marine engines produced relative to automotive engines, which forces marine engine manufacturers to commonly obtain cylinder head gaskets from suppliers who provide similar gaskets to automotive engine manufacturers. In addition, aluminum marine engines are but a portion of the total production of marine engines. In view of this situation, most marine engine manufacturers have concentrated their corrosion inhibiting design efforts to changes in the engines themselves.

One attempt which has been made to minimize marine engine galvanic corrosion has been to provide sacrificial water jacket anodes made of zinc or aluminum. These anodes are mounted within the engine cylinder block or cylinder head and are designed to have a greater solution potential than the engine block and cylinder head material. However, when such anodes are placed in the cylinder head, it is difficult to easily determine when the anodes are depleted to the extent that replacement is required. Once the anodes are depleted, if they are not promptly replaced, galvanic corrosion may still begin. Also, the use of sacrificial anodes increases the cost and assembly time of marine engines.

An additional drawback of supplemental sacrificial anodes is that due to their mounting in the water galleries of the engine, adjacent to but not contacting the head gasket, once the engine is no longer operating, these anodes do not prevent galvanic corrosion due to the residual moisture held by the wet facing material.

Another attempt at minimizing galvanic corrosion has been to coat corrosion susceptible engine surfaces with a non-reactive paint or electrochemical barrier coating which is intended to prevent the inducement of the electrochemical reaction. However, the longevity and effectiveness of such coatings in the high temperature, corrosive environments of marine engines has not yet been established.

Accordingly, it is an object of the present invention to provide a gasket for a marine engine which is designed to minimize galvanic corrosion between the gasket and the engine components which contact the gasket.

It is another object of the present invention to provide a gasket for disposition between contacting nonferrous metal surfaces of a marine engine, the gasket having a metallic core which minimizes galvanic corrosion of the gasket as well as the contacting engine surfaces.

It is yet another object of the present invention to provide a cylinder head gasket for a marine engine having a non-ferrous alloy cylinder head and engine block, the gasket having a metallic core which minimizes galvanic corrosion of the gasket as well as the cylinder head and block.

SUMMARY OF THE INVENTION

Accordingly, the above-listed objects are satisfied by the present cylinder head gasket for use in a marine engine having contacting metal surfaces, such as a nonferrous metal alloy cylinder head and an engine block of similar material. The gasket has a non-ferrous metal alloy core sandwiched between layers of facing material. The metallic gasket core is selected to be of a material which minimizes the difference in electrolytic solution potential between the contacting surfaces. In the case of a cylinder head gasket, the difference between the solution potentials of the cylinder head and the gasket core, and between the engine block and the gasket core are negligible. In this manner, galvanic corrosion is minimized.

More specifically, the present invention includes a gasket for use in a marine engine adapted to be cooled by the water in which the engine is running, the engine having at least one location of contacting first and second non-ferrous metal surfaces, and the first and second surfaces each having an electrolytic solution potential. The gasket includes a metallic sheet forming a core, the core having an upper surface, and a lower surface, a first layer of facing material securely disposed upon the upper surface of the core, a second layer of facing material securely disposed upon the lower surface of the core, wherein the electrolytic solution potential of the core is approximately equal to the respective electrolytic solution potentials of the first and second engine surfaces.

DETAILED DESCRIPTION OF THE PREFERRED EMBODIMENT

Figure 1:
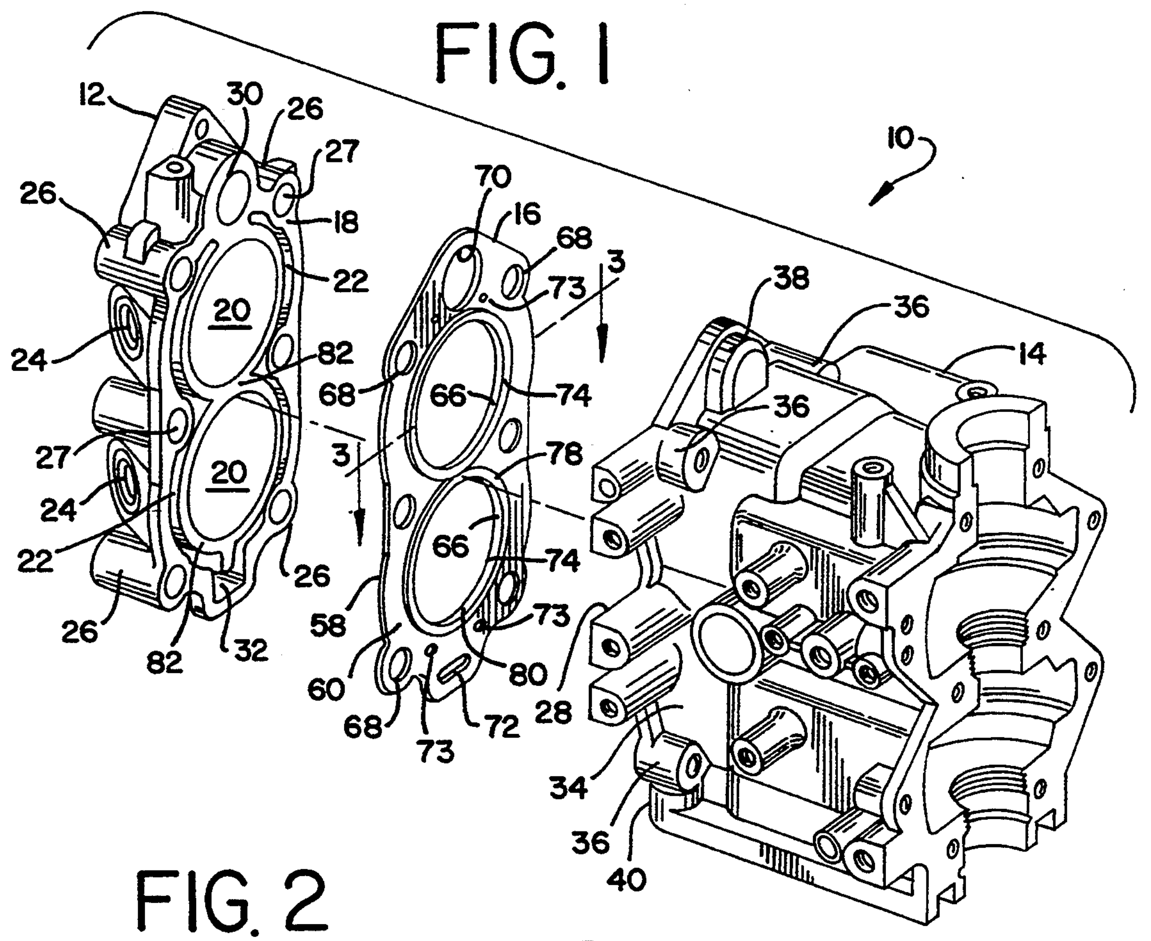
FIG. 1 is an exploded top perspective view of a marine engine suitable for use with the present cylinder head gasket.

Referring now to FIG. 1, a marine engine is generally indicated at 10. The engine 10 is of the type which is cooled by the ambient water in which the engine is running, and includes a cylinder head 12 and an engine cylinder block 14, which is represented by the upper portion of the block. The lower portion of the block, which encloses the crankcase, is not illustrated. A cylinder head gasket 16 is adapted to be disposed between the cylinder head 12 and the block 14 as is known in the art.

The cylinder head 12 and the block 14 are cast of metallic material, and in the preferred embodiment are made of aluminum due the higher power-to-weight ratio provided by aluminum, however the use of other non-ferrous alloys is contemplated. Steel or cast iron marine engines are less desirable from a power-to-weight ratio standpoint, and have not been particularly susceptible to galvanic corrosion.

The cylinder head 12 is of hollow construction and includes a lower surface 18 into which are formed at least one and preferably two, three, four, six or eight generally hemispherically shaped combustion chambers 20, one chamber for each cylinder of the engine 10. The chambers 20 are each substantially surrounded by a cooling gallery 22, through which water is pumped as is known in the art. The cylinder head 12 also includes a spark plug bore 24 for each cylinder, as well as a plurality of mounting bosses 26 defining bores 27 through which bolts (not shown) pass to secure the head to an upper surface 28 of the block 14 as is known in the art.

A coolant intake 30 located at a first end of the cylinder head 12 provides cooling water with access to the interior of the cylinder head through a thermostat (not shown) as is well known in the art. A coolant outlet 32 is located at the opposite end of the cylinder head 12 and is also in fluid communication with the hollow interior of the cylinder head.

The engine cylinder block 14 is preferably of the open deck type, wherein the cylinders are attached only at their lower ends to the block and are surrounded by coolant confined by the outer block wall 34. A plurality of mounting bosses 36 are dimensioned and positioned to be in concentric relationship with corresponding bosses 26 on the cylinder head 12 for securing the head to the cylinder block 14. A coolant port formation 38 is positioned adjacent the upper surface 28 of the block 14 to provide coolant from the block to the intake 30 on the cylinder head 12. Similarly, a coolant inlet: port 40 located on the block 14 opposite the intake formation 38, receives coolant from the coolant outlet 32 of the cylinder head 12.

Figure 2:
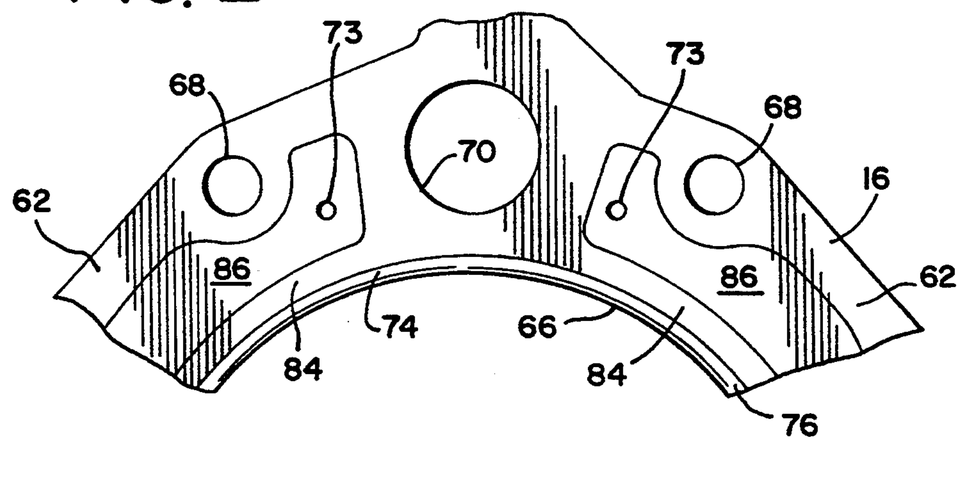
FIG. 2 is a fragmentary overhead plan view of the gasket of the invention.
Figure 3:
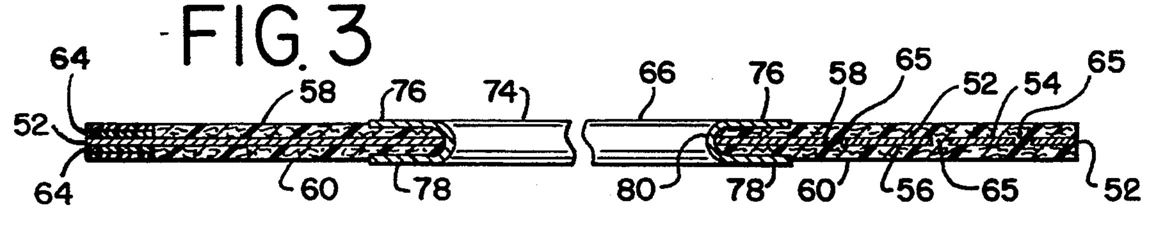
FIG. 3 is a sectional view taken along the line 3—3 of FIG. 1 and in the direction indicated generally.

Referring now to FIGS. 1–3, the gasket 16 of the invention includes a metallic sheet forming a core 52, the core having an upper surface 54, and a lower surface 56. In the preferred embodiment, the core 52 is fabricated of a non-ferrous metal alloy selected to have an electrolytic solution potential which is approximately equal to the electrolytic solution potential of the cylinder head 12 and the block 14. Preferably, when the cylinder head and block are made of aluminum, the core 52 is also made of aluminum.

Electrolytic solution potentials are measured in millivolts, and for purposes of minimizing galvanic corrosion, it is preferred that the differences in solution potentials between the core 52 and either the cylinder head 12 or the block 14 be no more than approximately 50–75 millivolts, with a difference of approximately 20 millivolts being most desirable.

A first layer 58 of facing material is securely disposed upon the upper surface 54 of the core 52, and a second layer 60 of facing material is securely disposed upon the lower surface 56 of the core, so that the core is sandwiched between the layers of facing material.

The composition of the upper and lower layers 58, 60 of facing material is known in the art, and normally includes specified amounts of heat resistant aramid fibers, clay or other type of inorganic fillers bound by a synthetic elastomer, and, if desired, rubber, silicone or similar materials. Regardless of its composition, the purpose of the facing material is to spread the cylinder head bolt loading force over the entire contact areas of the lower surface 18 of the cylinder head 12 and the upper surface 28 of the engine block 14. In this manner, a more complete, water-tight seal is created between the cylinder head 12 and the block 14. Once the gasket 16 is removed from an engine, this sealed area which is subject to the bolt loading force is indicated by the observable compressed band 62 (best seen in FIG. 2).

There are two methods of attaching the layers 58, 60 of facing material to the core 52. The first method employs chemical adhesive such as a waterproof, solvent based adhesive 64 (shown partially in FIG. 2 on the left side), which is applied between the layers 58, 60 of facing material and the core 52. If adhesive 64 is used, the core 52 is preferably of solid, nonperforated construction.

The second method of attaching the layers of facing material to the core is known as a mechanical attachment, in which the core is provided in perforated form, having a plurality of small openings 65 (best seen on the right side of FIG. 2). The facing material is rolled on the core 52 in wet form and is subsequently cured to harden in ways well known to skilled practitioners.

The gasket 16 is provided with at least one cylinder bore aperture 66, the number of apertures corresponding to the number of cylinders in the engine 10. Each aperture 66 passes entirely through the gasket 16, including the core 52, as well as the upper and lower layers 58, 60 of facing material. A plurality of cylinder bolt apertures 68 are also disposed around the periphery of the gasket 16 to be in registry with the bores defined by the bosses 26, 36 of the cylinder head 12 and engine block 14, respectively. The flow of coolant between the cylinder head and engine block is permitted through coolant openings 70, 72 in the gasket 16. The water gallery 22 receives coolant through relatively small openings 73.

An annular metallic combustion seal 74 is provided for disposition in each cylinder bore aperture 66 of the gasket 16, and is made of a corrosion and heat resistant material such as stainless steel. The combustion seal 74 has radially extending upper and lower flanges 76, 78, respectively, which are integrally joined along a common Inner edge at 80. The seal 74 is constructed to tightly sandwich the upper and lower layers 58, 60 of facing material and the core 52 between the flanges 76, 78. The flanges 76, 78 are also dimensioned to engage iron cylinder liners (not shown) and the aluminum water jacket walls (not shown) which surround the liners of the type which are commonly found on outboard marine engines. In this manner, the combustion area of the engine is sealed from the coolant.

In operation, the engine 10 is assembled in part by securing the cylinder head 12 to the block 14 with the gasket 16 disposed therebetween. The cylinder bolts used to fasten the cylinder head to the block compress the facing material to form the band 62 to effect a water tight seal. Likewise, the combustion seal 74 is tightly clamped between the walls 82 of the combustion chamber 20 (best seen in FIG. 1 ) and the iron liners and water jacket walls (not shown) of the block 14. This latter clamping force creates a zone of compression 84 in the gasket 16 (best seen in FIG. 2).

A coolant contact zone 86 is defined on the gasket 16 between the zone of compression 84 and the bolt clamping band 62. The coolant, which in the preferred embodiment is ambient sea or lake water, comes in contact with the gasket 16 only in the zone 86. It is this area, between the zone of compression 84 and the clamping band 62, which absorbs the water acting as an electrolyte, and which remains wet even after the engine has been turned off, to continue galvanic corrosion in aluminum marine engines provided with conventional, zinc-on-steel-core gaskets. However, in the present invention, the gasket core 52, the cylinder head 12 and the engine block 14 are all made of non-ferrous metal such as aluminum having approximately the same solution potential. As such, the electrochemical cell created in conventional engine-gasket arrangements is eliminated or reduced to the extent where galvanic corrosion occurs at a rate which corresponds with normal deterioration of the engine. It will be appreciated that although the present gasket 16 has been described as a cylinder head gasket, it could easily be employed anywhere on the marine engine 10 where metal surfaces must be joined to each other in the presence of cooling water.

While a particular embodiment of the aluminum core cylinder head gasket for marine engines of the invention has been shown and described, it will be appreciated by those skilled in the art that changes and modifications may be made thereto without departing from the invention in its broader aspects and as set forth in the following claims.

What is claimed is:

1. A gasket for use in a marine engine cooled by ambient salt water in which the engine is running, the engine having at least one location of first and second non-ferrous metal surfaces clamped together with said gasket therebetween in sandwiched relationship, the first and second surfaces each having an electrolytic solution potential and both of the surfaces being in contact with the ambient salt water coolant, said gasket comprising:

a metallic sheet forming a core, said core having an upper surface and a lower surface;

a first layer of water absorbing facing material securely disposed upon said upper surface of said core;

a second layer of water absorbing facing material securely disposed upon said lower surface of said core, at least one of said first and second layers of absorbent facing material including a coolant contact zone defined between a zone of compression and a bolt clamping band, said coolant contact zone being disposed for contact with the ambient salt water coolant and for contacting areas of the first and second metal surfaces between which said gasket is sandwiched, so that upon contact with the ambient salt water coolant, at least one of said first and second layers of facing material retain moisture in said zone and between said gasket core and at least one of said first and second metal surfaces for prolonged periods of time, thus creating the conditions for an electrolytic reaction between said core and at least one of the first and second metal surfaces; and the electrolytic solution potential of said core is approximately equal to the respective electrolytic solution potentials of the first and second metal engine surfaces to minimize galvanic corrosion of the first and second metal surfaces when at least one of said layers of facing material becomes saturated with the ambient salt water coolant.

2. The gasket as defined in claim 1 wherein the first and second engine surfaces are each made of aluminum, and said core of said gasket is made of aluminum.

3. The gasket as defined in claim 2 wherein said core is solid.

4. The gasket as defined in claim 3 further including a layer of adhesive for securing said upper and lower layers of facing material to said aluminum core.

5. The gasket as defined in claim 4 wherein said adhesive is solvent-based and waterproof.

6. The gasket as defined in claim 2 wherein said core is perforated.

7. The gasket as defined in claim 6 wherein said upper and lower layers of facing material are mechanically bonded to said core.

8. The gasket as defined in claim 1 wherein the first metallic engine surface is located on the cylinder head, and the second metallic engine surface is located on the engine block, said core having at least one cylinder bore aperture, and said first and second layers of facing material each having a corresponding cylinder bore aperture in registry with said cylinder bore aperture of said core, and further including an annular metallic combustion seal adapted for disposition in each said cylinder bore aperture of said core and said upper and lower layers of facing material, said combustion seal having radially extending upper and lower flanges joined along a common inner edge, said upper and lower layers of facing material and said core being sandwiched between said flanges.

9. The gasket as defined in claim 8 wherein said metallic combustion seal is made of stainless steel.

10. The gasket as defined in claim 1 wherein the engine surfaces include a cylinder head and an engine block, and a difference in electrolytic solution potential between one of the cylinder head and the engine block, and said gasket core is less than 75 millivolts.

11. The gasket as defined in claim 1 wherein the engine surfaces include a cylinder head and an engine block, and a difference in electrolytic solution potential between one or the cylinder head and the engine block, and said gasket core is approximately 20 millivolts.

12. A cylinder head gasket: for use in a marine engine cooled by ambient salt water in which the engine is running, the engine having an aluminum cylinder head having an electrolytic solution potential and an aluminum engine block having an electrolytic solution potential, the cylinder head and the engine block being exposed to the ambient salt water coolant and being clamped together with said gasket sandwiched therebetween, said gasket comprising:

an aluminum sheet forming a core, said core having an upper surface, a lower surface, and at least one cylinder bore aperture;

a first layer of water absorbing facing material securely disposed upon said upper surface of said core;

a second layer of water absorbing facing material securely disposed upon said lower surface of said core, at least one of said first and second absorbent layers of facing material including a coolant contact zone defined between a zone of compression and a bolt clamping band, said coolant contact zone being disposed for contact with the ambient salt water coolant and for contacting areas of the cylinder head and engine block between which said gasket is sandwiched, so that upon contact with the ambient salt water coolant, at least one of said first and second layers of facing material remains moisture in said zone and between said core and at least one of the engine block and the cylinder head for prolonged periods of time, thus creating the conditions for an electrolytic reaction between said core and at least one of the cylinder head and engine block, and said first and second layers of facing material each having a corresponding cylinder bore aperture in registry with said cylinder bore aperture of said core;

said facing material comprising at least one of heat resistant aramid fibers, clay and inorganic fillers bound together;

an annular metallic combustion seal adapted for use as a combustion seal in each said cylinder bore aperture of said core and said upper and lower layers of facing material, said combustion seal having radially extending upper and lower flanges joined along a common inner edge, said upper and lower layers of facing material and said core being sandwiched between said flanges; and the difference in electrolytic solution potential between one of the cylinder head and the engine block, and said gasket core is less than 75 millivolts to minimize galvanic corrosion of the cylinder head and the engine block as said at least one layer of facing material becomes saturated with salt water.

13. A marine engine cooled by ambient salt water in which the engine is running, the engine comprising:

an aluminum cylinder head having a lower surface;

an aluminum engine block having an upper surface, said lower surface of said cylinder head being configured for operational engagement upon said upper surface of said block, both said cylinder head and said block being exposed to the ambient salt water;

a cylinder head gasket adapted to be disposed between said engaged surfaces of said cylinder head and said engine block, said gasket including:

an aluminum sheet forming a core, said core having an upper surface, a lower surface, and at least one cylinder bore aperture;

a first layer of water absorbing facing material securely disposed upon said upper surface of said core;

a second layer of water absorbing facing material securely disposed upon said lower surface of said core, at least one of said first and second absorbent layers of facing material including a coolant contact zone defined between a zone of compression and a bolt clamping band, said coolant contact zone being disposed for contact with the ambient salt water coolant and contacting areas of said cylinder head and said engine block between which said gasket is disposed, so that upon contact with the ambient salt water coolant, at least one of said first and second layers of facing material retains moisture in said zone and between said core and at least one of said engine block and said cylinder head for prolonged periods of time, thus creating the conditions for an electrolytic reaction between said core and at least one of the cylinder head and engine block, and said first and second layers of facing material each having a corresponding cylinder bore aperture in registry with said cylinder bore aperture of said core; and the difference in electrolytic solution potential between one of said cylinder head and said engine block, and said gasket core is less than 75 millivolts to minimize galvanic corrosion of said block and said head as said at least one layer of facing material becomes saturated with salt water.

14. The engine as defined in claim 13 wherein said annular combustion seal is made of stainless steel.

15. The engine as defined in claim 13 wherein said core is solid.

16. The engine as defined in claim 15 further including a layer of adhesive for securing said upper and lower layers of facing material to said core.

17. The engine as defined in claim 13 wherein said core is perforated.

18. The engine as defined in claim 17 wherein said upper and lower layers of facing material are mechanically bonded to said core.

19. The engine as defined in claim 13 wherein a difference in electrolytic solution potential between one of said cylinder head and said engine block, and said gasket core is approximately 20 millivolts.

* * * * *